United States Patent
McIntyre et al.

(10) Patent No.: US 11,622,227 B2
(45) Date of Patent: *Apr. 4, 2023

(54) LOCATION TRACKING WITH LOITERING LOGIC

(71) Applicant: INTUIT INC., Mountain View, CA (US)

(72) Inventors: Nathan A. McIntyre, Eagle, ID (US); Devin Shively, Eagle, ID (US); Joshua Andrew Yundt, Eagle, ID (US)

(73) Assignee: INTUIT INC., Mountain View, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 17/111,550

(22) Filed: Dec. 4, 2020

(65) Prior Publication Data

US 2021/0120364 A1 Apr. 22, 2021

Related U.S. Application Data

(63) Continuation of application No. 16/400,685, filed on May 1, 2019, now Pat. No. 10,917,739.

(51) Int. Cl.
*H04W 4/021* (2018.01)
*H04W 4/02* (2018.01)
*H04W 4/029* (2018.01)
*H04W 52/02* (2009.01)
*H04W 12/61* (2021.01)
*H04W 12/63* (2021.01)

(52) U.S. Cl.
CPC .......... *H04W 4/021* (2013.01); *H04W 4/027* (2013.01); *H04W 4/029* (2018.02); *H04W 4/022* (2013.01); *H04W 4/023* (2013.01); *H04W 4/025* (2013.01); *H04W 12/61* (2021.01); *H04W 12/63* (2021.01); *H04W 52/0209* (2013.01)

(58) Field of Classification Search
CPC ..... H04W 4/021; H04W 4/029; H04W 4/023; H04W 4/022; H04W 12/00502; H04W 12/00503; H04W 4/025; H04W 4/027; H04W 52/0209
See application file for complete search history.

(56) References Cited

U.S. PATENT DOCUMENTS

| | | | |
|---|---|---|---|
| 9,113,309 B2 * | 8/2015 | Uilecan | G06Q 10/109 |
| 9,906,917 B2 * | 2/2018 | Zhang | H04W 4/029 |
| 2012/0208549 A1 | 8/2012 | Lau | |
| 2013/0023291 A1 | 1/2013 | Pilskalns | |
| 2014/0310366 A1 | 10/2014 | Fu | |

(Continued)

*Primary Examiner* — Jaime M Holliday
(74) *Attorney, Agent, or Firm* — DLA Piper LLP (US)

(57) ABSTRACT

A location system of a mobile device may detect a first location and a second location of the mobile device. A processor of the mobile device may determine that the first location and second location are within a geofence surrounding the location of interest. The processor may determine a speed at which the mobile device traveled from the first location to the second location. The processor may determine that the mobile device is loitering at the location of interest in response to the speed being below a threshold value. In response to determining that the mobile device is loitering at the location of interest, the processor may perform check in processing to check a user of the mobile device as being on site at the location of interest.

20 Claims, 9 Drawing Sheets

(56) References Cited

U.S. PATENT DOCUMENTS

| | | |
|---|---|---|
| 2015/0032366 A1 | 1/2015 | Man |
| 2015/0087264 A1* | 3/2015 | Goyal .................. H04W 4/027 |
| | | 455/411 |
| 2015/0327015 A1 | 11/2015 | So |
| 2016/0112868 A1 | 4/2016 | Biswas |
| 2017/0034656 A1 | 2/2017 | Wang |
| 2018/0091940 A1 | 3/2018 | Gonzalez |

* cited by examiner

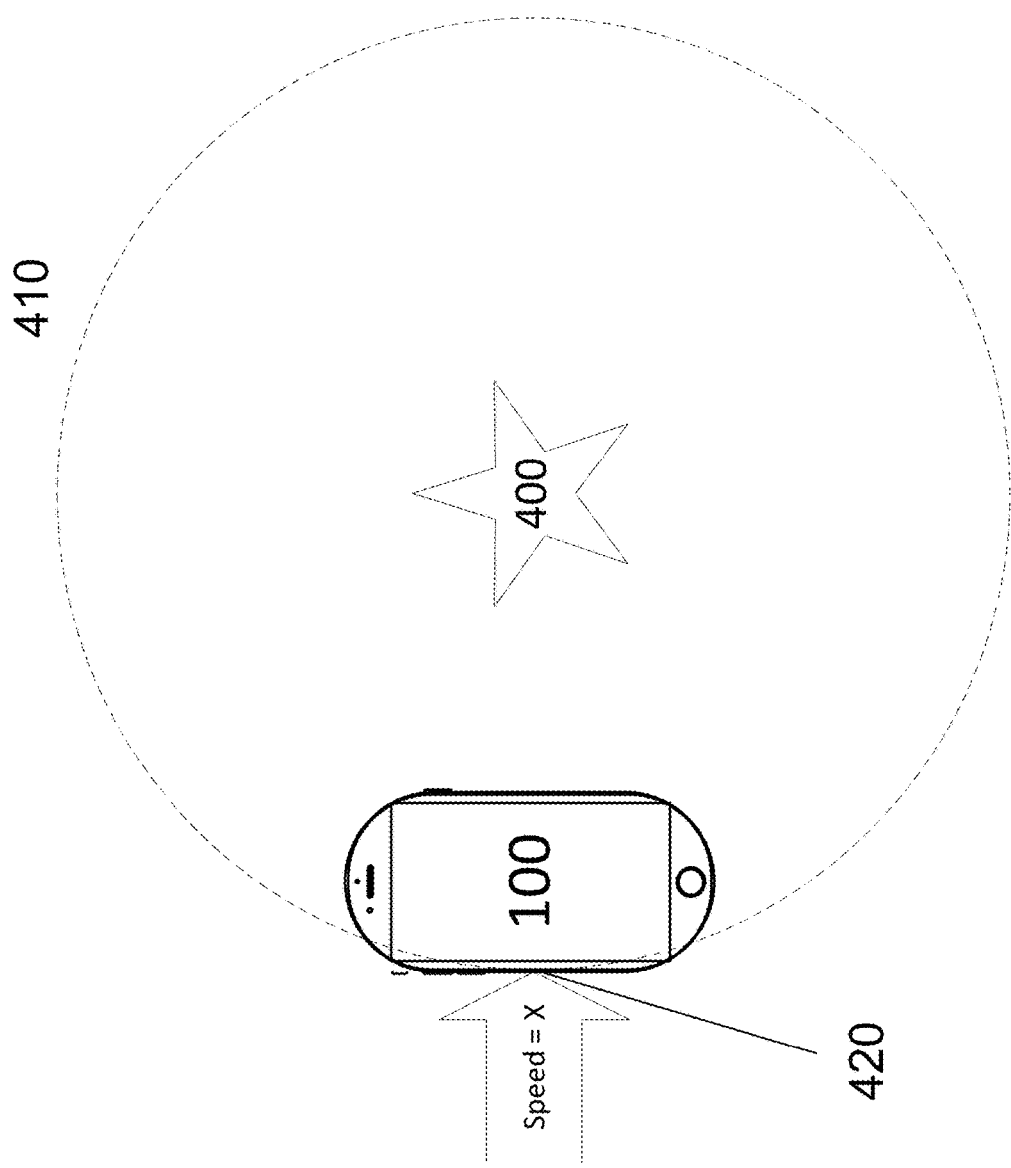

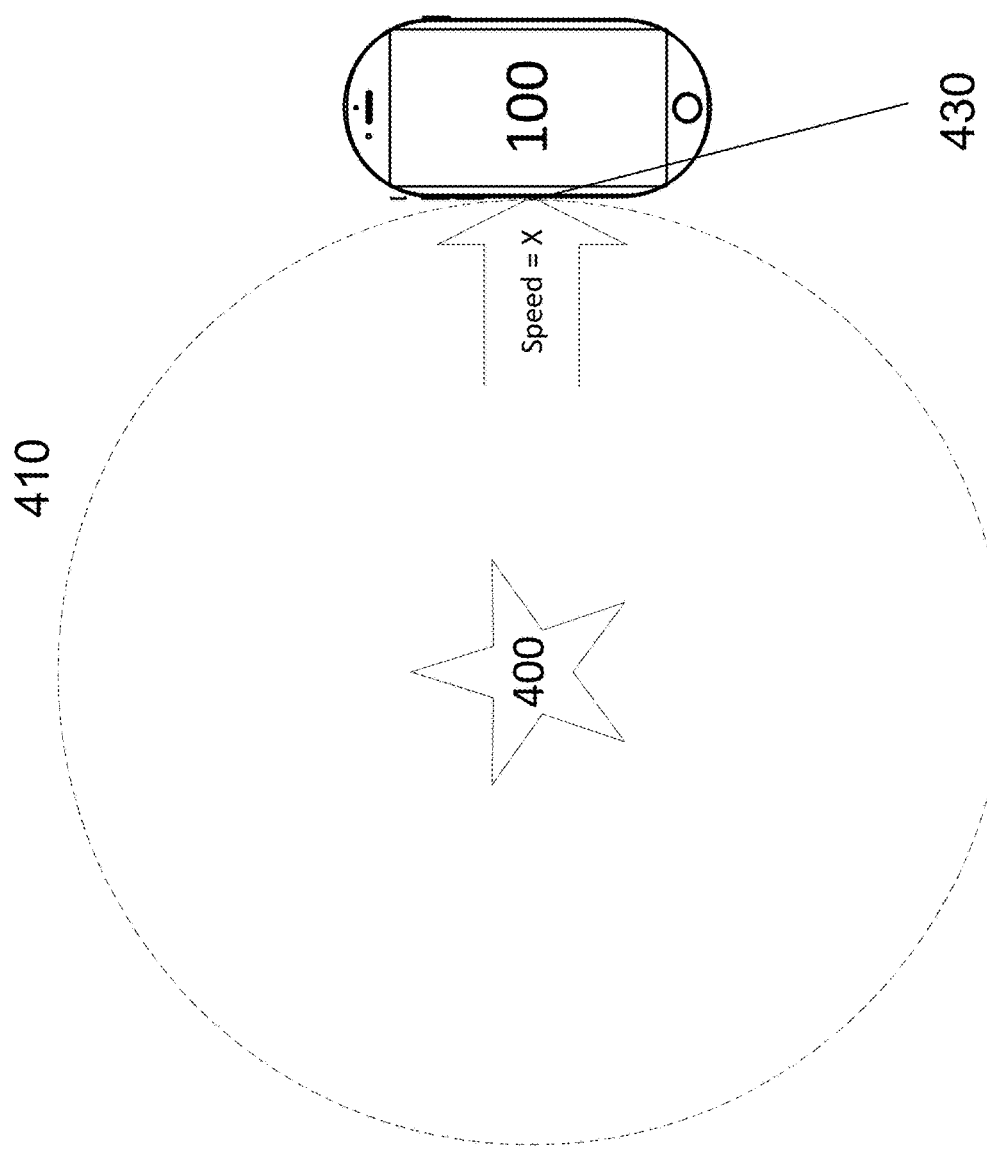

LOCATION TRACKING WITH LOITERING LOGIC

CROSS REFERENCE TO RELATED APPLICATIONS

This application is a Continuation Application of U.S. application Ser. No. 16/400,685, filed May 1, 2019, entitled LOCATION TRACKING WITH LOITERING LOGIC. The content of the above-identified application is incorporated herein by reference in its entirety.

BRIEF DESCRIPTION OF THE FIGURES

FIGS. 4A-4B show a mobile device according to an embodiment of the present disclosure.

DETAILED DESCRIPTION OF SEVERAL EMBODIMENTS

Embodiments described herein may provide accurate and efficient location tracking of mobile devices in general and/or in relation to one or more predetermined destinations. Some embodiments may perform location tracking by repeatedly provisioning a geofence at a current location of the device. In some embodiments, the size of each geofence may be set based on a speed and/or velocity at which the device is moving, thereby preventing the device from outrunning the geofence. Some embodiments may perform automatic check in/checkout to locations of interest by provisioning a fixed geofence at a job site or other location. For example, an employee who is required to check in and out of a job site may carry a mobile device, and may be automatically checked in and/or out upon entering and/or leaving the job site, and/or may be automatically notified that they should check in and/or out upon entering and/or leaving the job site. Some embodiments may not only detect entry into and/or exit from the geofenced area, but may also evaluate device speed and/or velocity to determine whether the device is loitering inside the area (e.g., indicating long term presence in the area) or merely traveling through the area (e.g., passing a geofenced job site on the way to a different place).

Dynamic geofencing provisioning may allow for accurate device location tracking without continuously polling device location. For example, the device may only confirm its location when it crosses a geofence boundary in order to draw a new boundary, which may save power use, battery life, and/or processing requirements compared with location tracking that relies on more frequent location polling. Checking device speed and/or velocity in addition to location may allow appropriately large geofences to be drawn dynamically to avoid excessive location polling. Device speed and/or velocity data may also enable the automatic check in/checkout features of the disclosed embodiments by providing verification that a device is on a site for an acceptable length of time to be regarded as on site rather than passing through.

Some of the methods described herein may be performed by a mobile device that has installed thereon one or more applications ("apps") that may include tracking and/or check in/check out functionality. For example, some mobile devices may include an app that allows a user to check in to a job site. The user of the mobile device may log in, and the app may track the mobile device. When the mobile device is on the job site, the user may be automatically checked in or may be prompted to check in. When the mobile device leaves the job site, the user may be automatically checked out or may be prompted to check out.

Figure 1A:
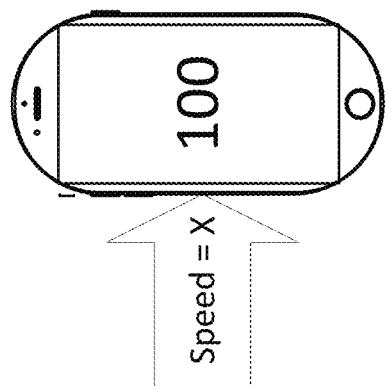
FIGS. 1A-1C show a mobile device according to an embodiment of the present disclosure.
Figure 1B:
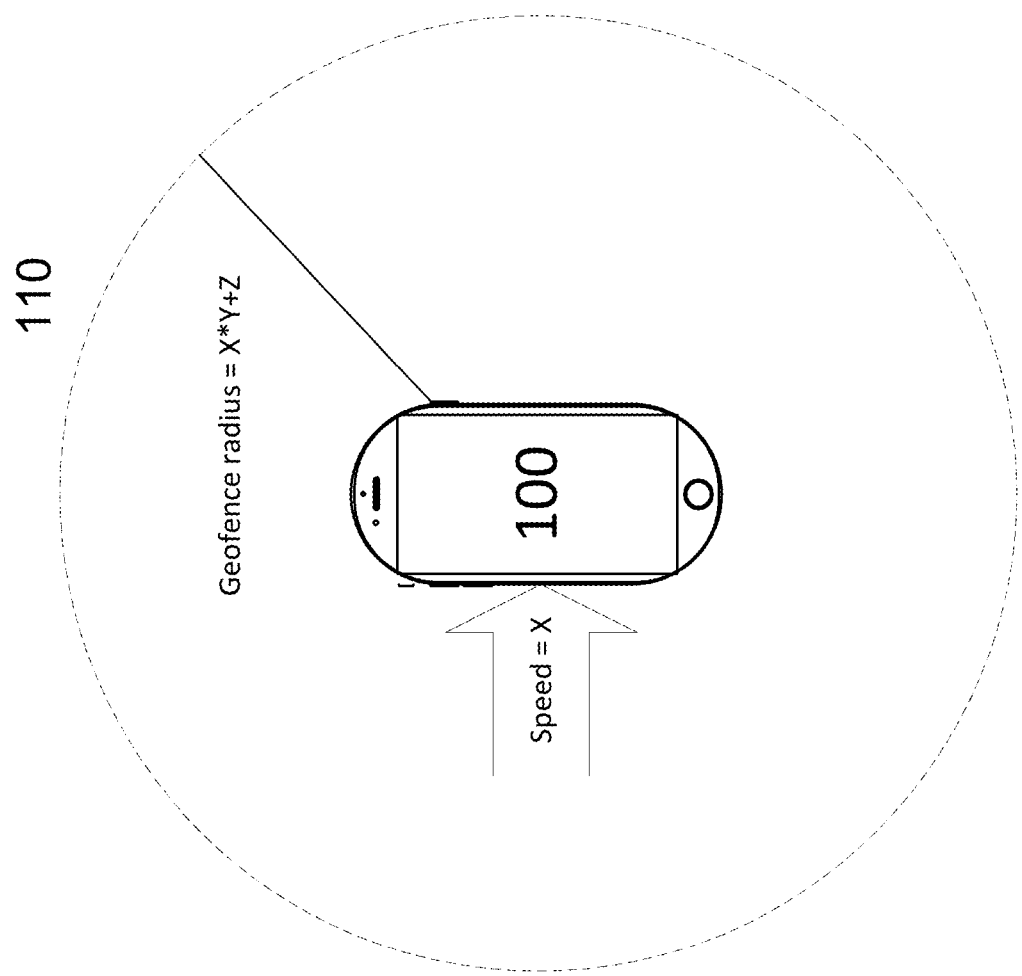
Figure 1C:
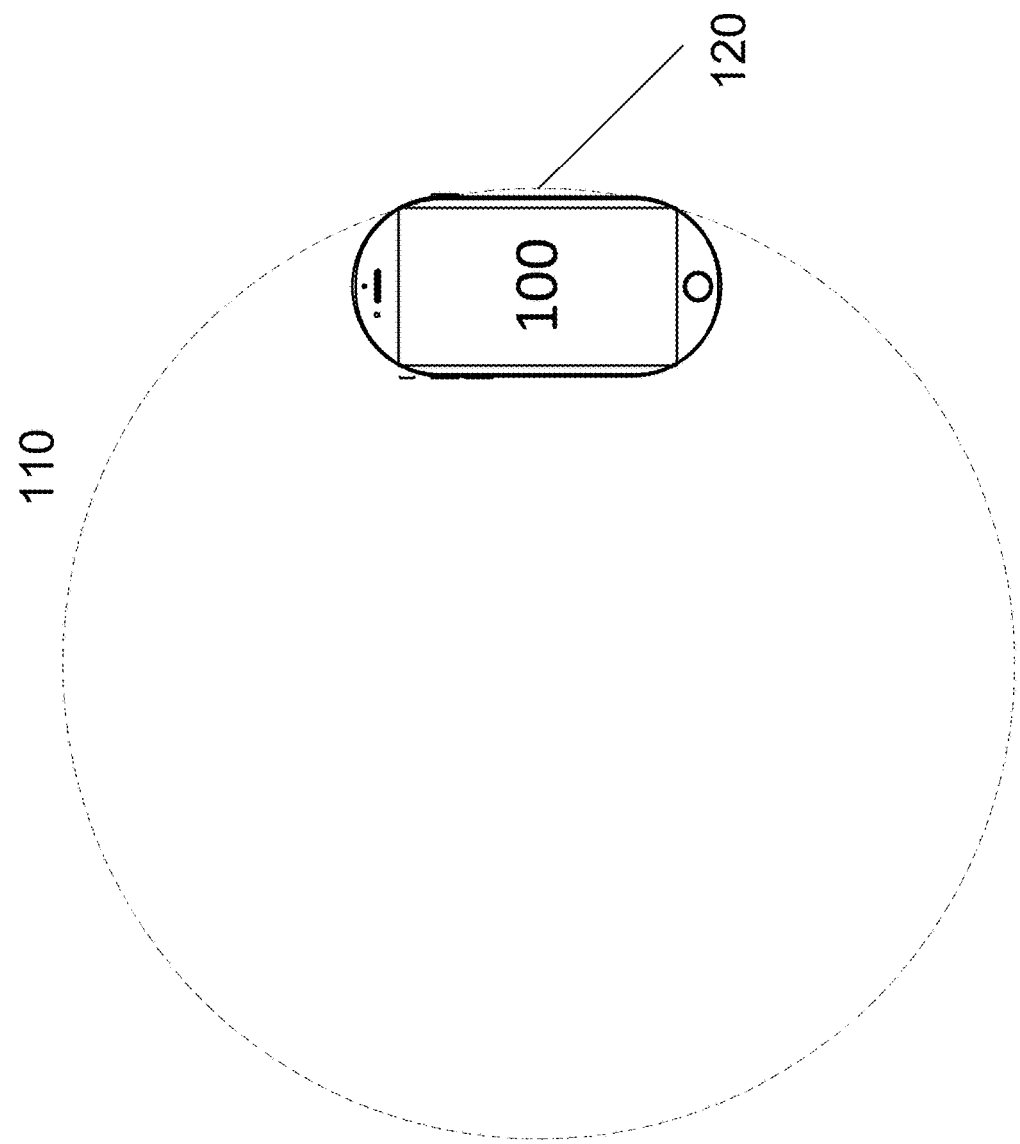

FIGS. 1A-1C show a mobile device 100 according to an embodiment of the present disclosure. Mobile device 100 may be, for example, a smartphone, smart watch, tablet, or other computing device that may be carried and/or transported by a user. Mobile device 100 may be configured to determine its location. For example, mobile device 100 may include a global positioning system (GPS) transceiver and/or other location determining hardware and/or software, such as systems that may be configured to perform triangulation or location based on cell towers and/or wireless network devices. Mobile device 100 may poll its location, for example by communicating with one or more GPS satellites, cell towers, wireless network devices, etc. Some embodiments may utilize built in location polling functionality of the operating system and/or default software of mobile device 100 to poll locations. For example, a location service that may perform device location determination may be an included feature in the Android™ and iOS™ operating systems.

As shown in FIG. 1A, mobile device 100 may move through space, for example when being carried by a user. For example, a user may carry a smartphone while traveling on foot or in a vehicle. In some embodiments, mobile device 100 may be configured to determine speed and/or velocity. For example, mobile device 100 may check its location twice, with a known time interval between checks and/or with a time stamp being recorded for each check indicating when each check was made. Based on the time interval and/or time stamps and the distance mobile device 100 traveled in that time interval, mobile device 100 may calculate its speed. In some embodiments, mobile device 100 may determine its velocity based on the time interval, the distance mobile device 100 traveled in that time interval, and the direction in which device 100 traveled in that time interval. In some embodiments, mobile device 100 may check its location more than twice with the same known time interval between checks, and use the multiple location points to determine acceleration.

As part of a geofence-based location tracking process (e.g., as described in FIGS. 2-3), mobile device 100 may determine a geofence 110 around its location. For example, as shown in FIG. 1B, the radius of the geofence 110 may be based on the speed of mobile device 100. In some embodiments, the radius may be a default fence size value Z plus speed X of mobile device 100, or, in other embodiments, the radius may be a default fence size value Z plus speed X of mobile device 100 multiplied by a multiplier Y.

As shown in FIG. 1C, determining a geofence 110 may allow detection of exit events 120 where mobile device 100 leaves geofence 110. For example, even in cases where mobile device 100 polls its location infrequently, it still may do so periodically. If mobile device 100 detects its location at the edge of geofence 110 and/or outside geofence 110, mobile device 100 may determine that it has left geofence 110. As described in greater detail below, exit events 120 may trigger mobile device 100 to draw a new geofence 110, may mark job site entry and/or exit events, or may serve other mobile device 100 tracking purposes.

Figure 2:
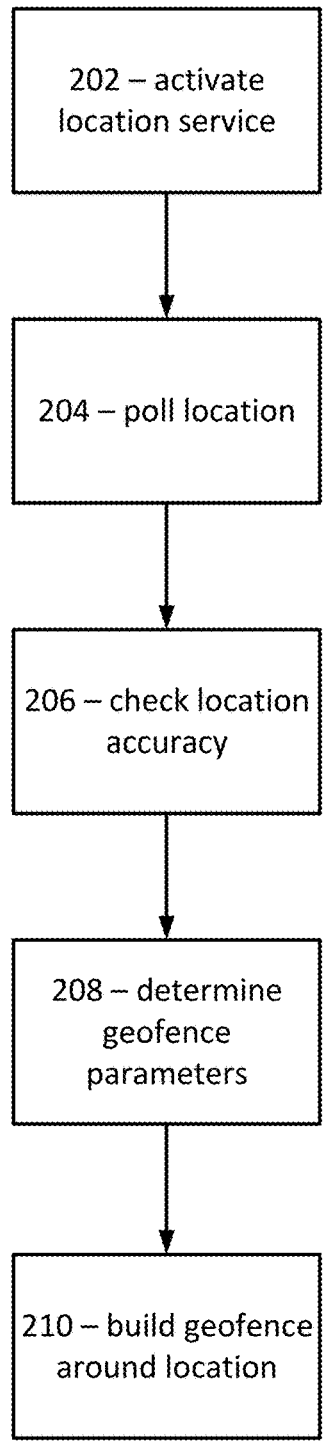
FIG. 2 shows a geofencing process according to an embodiment of the present disclosure.

FIG. 2 shows a geofencing process 200 according to an embodiment of the present disclosure. Mobile device 100 may perform process 200 to determine a location tracking geofence 110 around its own location. For example, mobile device 100 may repeatedly create geofences 110 during a location tracking process 300, as described below with respect to FIG. 3.

At 202, mobile device 100 may activate its location service. For example, as noted above, a location service that may perform device location determination may be an included feature in the Android™ and iOS™ operating systems and/or may be otherwise available from mobile device 100 hardware and/or software. Mobile device 100 may activate this service, which may allow mobile device 100 to determine its location.

At 204, mobile device 100 may poll its location. For example, mobile device 100 may use the location service to determine the current location of mobile device 100, wait for a predetermined interval of time (e.g., 1 second, 5 seconds, etc.), and use the location service to determine the current location of mobile device 100 a second time. Each time the location service determines the current location of mobile device 100, the location service may return location coordinates and, in some embodiments, a time stamp at which the location was determined and/or an accuracy indication describing an accuracy level of the location (e.g., accurate to within 1 meter, 10 meters, etc.). In some embodiments, mobile device 100 may set the predetermined interval of time to be greater than a default interval of time used by the location service for default location tracking functions of mobile device 100, resulting in a lower rate of polling and, therefore, reduced power use by mobile device 100.

At 206, mobile device 100 may check the accuracy of the locations determined at 204. For example, mobile device 100 may evaluate accuracy indications provided by the location service. If an accuracy indication is above a predetermined threshold, mobile device 100 may reject the location and repeat processing at 204. For example, mobile device 100 may accept a location accurate to within 1 meter, but may reject a location accurate to within 1 kilometer. In some embodiments, mobile device 100 may evaluate the accuracy by comparing the consecutive two locations determined at 204. If the locations are farther apart than device 100 could plausibly have traveled in the interval of time, mobile device 100 may reject the locations and repeat processing at 204. For example, if a first and second location determined at 204 are a greater distance apart than a predetermined threshold, mobile device 100 may reject them (e.g., a mobile device 100 cannot travel 1000 km across the surface of the earth in 1 second, so if the two distances are 1000 km apart with a 1 second time interval, the distances may be above the threshold and may be rejected).

After confirming the locations are accurate and/or repeating processing at 204 and 206 until accurate locations are found, at 208, mobile device 100 may determine geofence 110 parameters. For example, mobile device 100 may specify a circular geofence 110 around the second location determined at 204 with a radius as shown in FIG. 1B. Default value Z may be based on the accuracy determined at 206. For example, if the accuracy reported by location service for the second location is 150 meters, Z may be 150 meters. Speed X may be determined based on the times at which two locations were determined and the distance between those two locations. Speed multiplier Y may be a value based on a processing parameter of mobile device 100. For example, mobile device 100 may require 30-60 seconds to draw a geofence (e.g., at 210), based on hardware and/or software limitations. Accordingly, speed multiplier Y may be selected to be large enough to prevent mobile device 100 from being able to leave the to-be-drawn geofence area during the drawing time, given realistic travel speeds. For example, Y may be set to 20, so that the radius may be 20*(speed)+Z, which may be adequate for travel speeds for known land vehicles.

At 210, mobile device 100 may build the geofence 110 around the second location. For example, a geofence building service may be built into the Android™ and iOS™ operating systems and/or may be otherwise available from mobile device 100 hardware and/or software. Mobile device 100 may call the geofence building service and provide the geofence 110 center point (the second location) and radius (X*Y+Z), and a geofence 110 may be built according to these parameters. Accordingly, the geofence 110 may be dynamically constructed dependent upon the velocity at which mobile device 100 is traveling at the time construction is initiated. This may prevent the mobile device 100 from outrunning the geofence 110.

Figure 3:
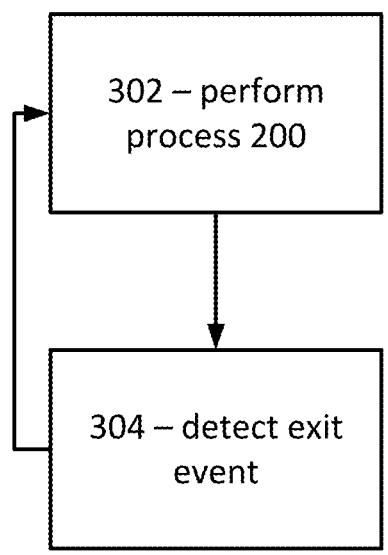
FIG. 3 shows a location tracking process according to an embodiment of the present disclosure.

FIG. 3 shows a location tracking process 300 according to an embodiment of the present disclosure. Location tracking process 300 may repeat process 200 a plurality of times to track mobile device 100 location. Location tracking process 300 may reliably and accurately track mobile device 100 while polling for mobile device 100 location less frequently than other tracking methods, such as those that rely on directly polling mobile device 100 location repeatedly for tracking.

At 302, mobile device 100 may perform process 200. As a result, mobile device 100 may generate a geofence 110 around its current location, as described above.

At 304, mobile device 100 may detect a geofence 110 exit event 120, wherein mobile device 100 exits the geofence generated at 302. Mobile device 100 may include one or more built-in features (e.g., elements of the operating system and/or positioning system) that may generate exit event data. For example, process 300 may receive a notification from a platform specific SDK tool upon a geofence exit event 120. In some embodiments, mobile device 100 may wait for a fixed interval of time to check its location and determine whether it is within the geofence generated at 302. If not, mobile device 100 may determine that an exit event 120 has occurred.

In response to the exit event 120, mobile device 100 may return to 302 and repeat process 200. After a new geofence is generated, the previous geofence may be deleted from mobile device 100 memory in some embodiments to avoid storing excessive data and/or to avoid exceeding a limit on available geofences that may be set by some mobile devices 100. Generating a geofence at 302 and detecting an exit event 120 at 304 may be performed repeatedly as mobile device 100 moves through space. In some embodiments, process 300 may run continuously as long as a tracking app is active on mobile device 100, for example. In some embodiments, mobile device 100 may record routes while the tracking app is active (e.g., even if mobile device 100 discards old geofences, mobile device 100 may retain a record of detected locations with their time stamps, so a route traveled by mobile device 100 may be recorded, observed, and/or reconstructed).

FIGS. 4A-4B show a mobile device 100 according to an embodiment of the present disclosure. In this example, mobile device 100 is near a location 400 of interest, such as a job site or other location at which individuals may check in and/or check out. Location 400 may be surrounded by location geofence 410. In some cases, location 400 may be a fixed location defined by coordinates or a fixed beacon or some other fixed definition. In some cases, location 400 may be movable. For example, location 400 may be another mobile device separate from mobile device 100 (e.g., a foreman's mobile device at a job site or the like). Location geofence 410 is shown as circular in FIGS. 4A-4B for ease of illustration, but location geofence 410 may be of any shape. In some cases, location geofence 410 may be configured to fully surround a location 400 having an arbitrary size and shape. In some embodiments, a given environment may include a plurality of locations 400, each with their own location geofence 410. For example, a city may include several job sites, and each job site may have its own location geofence 410.

As shown in FIG. 4A, mobile device 100 may enter location geofence 410. Mobile device 100 may be configured to detect its own entry into location geofence 410. For example, mobile device 100 may have a definition of location geofence 410 available in local mobile device 100 memory and/or through a network connection with a remote data source. The definition may be, for example, coordinates of location geofence 410, center point coordinates plus a draw radius for location geofence 410, or any other information that enables mobile device 100 to determine the bounds of location geofence 410. Mobile device 100 may be configured to determine its own location (e.g., through process 200 and/or 300 and/or by any other location determination process), so mobile device 100 may detect when its own location corresponds to a location geofence 410 boundary. Likewise, as shown in FIG. 4B, mobile device 100 may leave location geofence 410 and may be configured to detect its own exit from location geofence 410.

Mobile device 100 may log entries into location geofence 410 as check in events 420 and/or may log exits from location geofence 410 as check out events 430. In some embodiments, mobile device 100 may utilize loiter logic to determine whether to log check in events 420 and/or check out events 430, or whether to ignore such events as not being legitimate check ins and/or check outs. For example, a user may merely be passing through a location 400 without stopping. In this case, mobile device 100 may cross into and out of location geofence 410, but it would not be accurate to characterize the user as being checked in or out (e.g., as having checked into a job site to work there and leaving thereafter). On the other hand, if a user is truly at location 400 for a significant period of time, mobile device 100 may recognize the location geofence 410 crossings as check in events 420 and check out events 430 (e.g., because the user actually was on the job site to work and should therefore be checked in and out).

Figure 5:
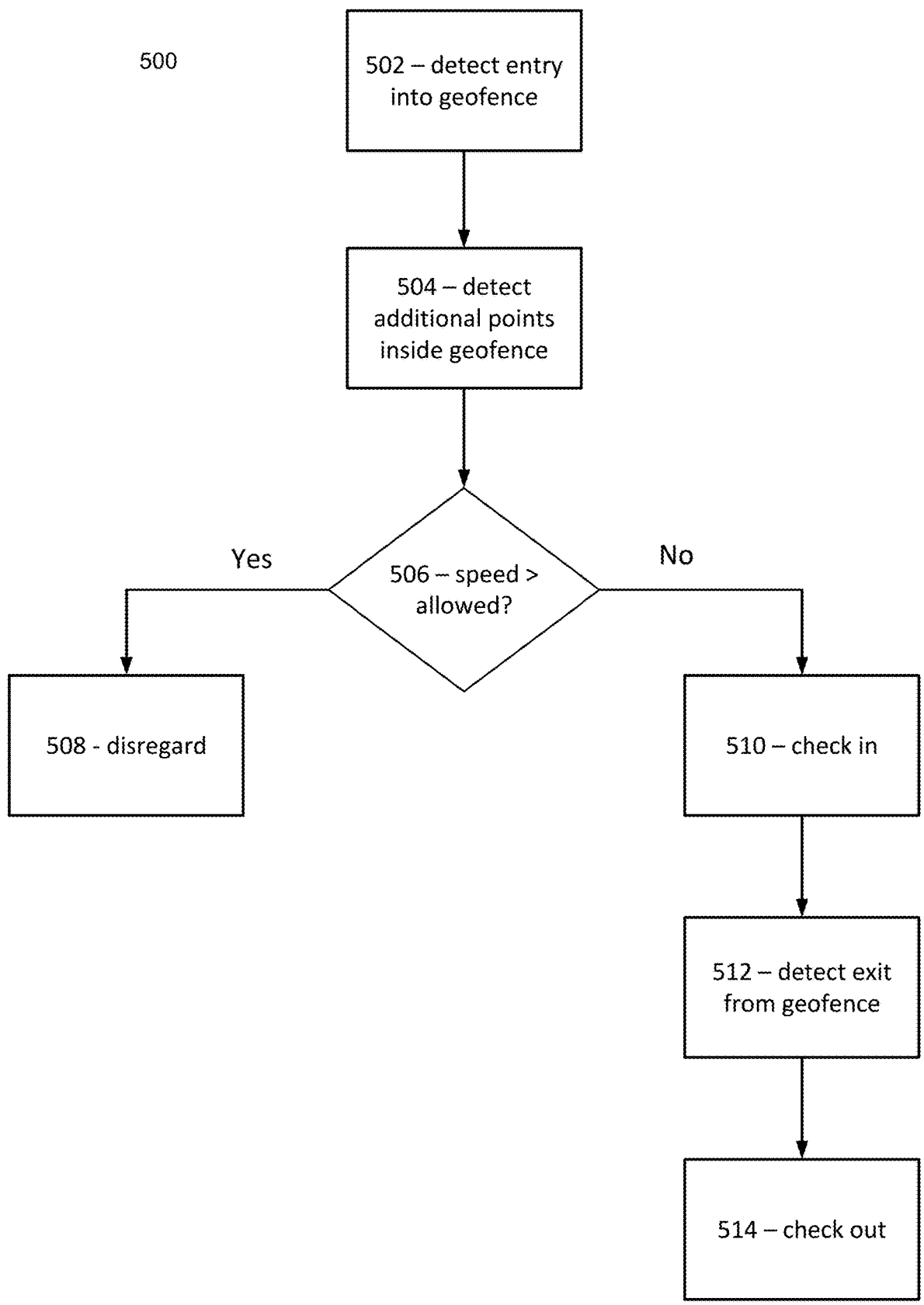
FIG. 5 shows a check in/check out process according to an embodiment of the present disclosure.

FIG. 5 shows a check in/check out process 500 according to an embodiment of the present disclosure. By performing process 500, mobile device 100 may apply loitering logic to determine whether to log events as check in events 420 and/or check out events 430.

At 502, mobile device 100 may detect entry into location geofence 410 by mobile device 100. For example, mobile device 100 may be performing location tracking through process 200 and/or 300 as described above, or mobile device 100 may be performing location tracking in some other way (e.g., through repeated location polling). Mobile device 100 may also have definitions of location geofences 410 available in local mobile device 100 memory and/or through a network connection with a remote data source. For example, mobile device 100 may be running an app or other process that identifies location geofences 410 in the vicinity of mobile device 100. Mobile device 100 may determine that its own location corresponds to a point outside any location geofences 410. Then, as mobile device 100 moves, mobile device 100 may determine that its own location has changed to a point shared by a boundary of a location geofence 410 and/or to a point inside the boundary of the location geofence 410. Accordingly, mobile device 100 may detect entry into location geofence 410. Mobile device 100 may store a time stamp indicating the time at which the entry was detected.

At 504, mobile device 100 may detect one or more additional mobile device 100 locations inside location geofence 410. In some embodiments, process 500 may require at least one location inside location geofence 410 in addition to that detected at 502 in order to proceed. For example, detecting multiple locations inside location geofence 410 may indicate that mobile device 100 is actually inside location geofence 410, and the initial location detected at 502 was not an erroneous reading. Mobile device 100 may store time stamps indicating the times at which each additional location was detected.

At 506, mobile device 100 may determine a speed at which mobile device 100 is moving. For example, based on the multiple detected locations of mobile device 100 and the time stamps (and/or known time intervals between detected locations if mobile device 100 is configured to poll its location periodically), mobile device 100 may calculate a speed at which mobile device 100 moved from a first detected location to a second detected location. Mobile device 100 may compare this speed to a threshold speed (e.g., stored in mobile device 100 memory and/or available from a remote data source through a network).

If the calculated speed is above the threshold speed, at 508, mobile device 100 may disregard the location geofence 410 entry as not being a true check in event. For example, the threshold speed may be set to some value consistent with travel in a vehicle (e.g., 10 mph, 25 mph, etc.). Accordingly, if the calculated speed is above the threshold speed, mobile device 100 may be most likely inside a vehicle that is passing near location 400, rather than being carried by a person who is stopping at location 400. By disregarding location geofence 410 entries that are associated with calculated speeds above the threshold speed, mobile device 100 may avoid accidentally checking into location 400 when mobile device 100 merely passed by location 400.

If the calculated speed is not above the threshold speed, at 510, mobile device 100 may determine that the entry into location geofence 410 is a check in event 420. Accordingly, this process 500 may provide loitering logic that allows mobile device 100 to verify that it is loitering at location 400, not just passing through. Mobile device may record a time stamp indicating when the check in event 420 took place or may adopt the time stamp from 502 as the indication of when the check in event 420 took place. Mobile device 100 may take one or more actions to record and/or effect the check in. In some embodiments, mobile device 100 may generate a notification that requests a user to check into location 400. For example, a user may be able to click on the notification, or otherwise open the check in app, and select an option for checking into location 400. In response to the user selection, or automatically in some embodiments, mobile device 100 may register the check in. For example, mobile device 100 may be running an app that places mobile device 100 in communication with a remote logging computer through a network (e.g., a wireless network). Mobile device 100 may automatically send a message to the remote logging computer indicating that mobile device 100 (and, therefore, a user thereof who has signed into the app) has checked into location 400. This may cause the remote logging computer to log the check in. Additionally or alternatively, the app may log the check in at mobile device 100 itself (e.g., within mobile device 100 memory). Logging the check in may include recording a time at which the check in event 420 took place (e.g., based on the time stamp).

At 512, mobile device 100 may detect exit from location geofence 410 by mobile device 100. In some embodiments, mobile device 100 may determine that its own location corresponds to a point inside the location geofence 410 to which it has checked in. In some embodiments, mobile device 100 may start from an assumption that mobile device 100 is inside the location geofence 410 to which it has checked in, because of the check in event 420 that was determined at 510. Then, as mobile device 100 moves, mobile device 100 may determine that its own location has changed to a point outside the boundary of the location geofence 410. Accordingly, mobile device 100 may detect an exit from location geofence 410. Mobile device 100 may store a time stamp indicating the time at which the exit was detected.

At 514, mobile device 100 may determine that the exit from location geofence 410 is a check out event 430. Mobile device may record a time stamp indicating when the check out event 430 took place or may adopt the time stamp from 512 as the indication of when the check out event 430 took place. Mobile device 100 may take one or more actions to record and/or effect the check out. In some embodiments, mobile device 100 may generate a notification that requests a user to check out from location 400. For example, a user may be able to click on the notification, or otherwise open the check in app, and select an option for checking out of location 400. In response to the user selection, or automatically in some embodiments, mobile device 100 may register the check out. For example, mobile device 100 may be running an app that places mobile device 100 in communication with a remote logging computer through a network (e.g., a wireless network). Mobile device 100 may automatically send a message to the remote logging computer indicating that mobile device 100 (and, therefore, a user thereof who has signed into the app) has checked out of location 400. This may cause the remote logging computer to log the check out. Additionally or alternatively, the app may log the check out at mobile device 100 itself (e.g., within mobile device 100 memory). Logging the check out may include recording a time at which the check out event 430 took place (e.g., based on the time stamp).

The following is an example scenario from the perspective of a user of mobile device 100 that may be enabled by the systems and methods described above. The user may begin to drive to a job site. Mobile device 100 may detect multiple job sites that are passed en route to the scheduled job site for the day. These may be ignored due to the loitering logic (e.g., determining the mobile device 100 has not stopped). The user may arrive at a designated job site and park the car. Mobile device 100 may detect this, save the arrival time, and present a notification to the user to confirm clock in. The user may begin working and may remember later in the day that he/she needs to clock in. The user may interact with the notification to check in. As the saved arrival time had been stored, mobile device 100 may automatically put the user on the clock with the right customer/job code and clock in time. Later in the day the user may need to drive to the store for parts. Mobile device 100 may use the location tracking algorithm to accurately record the location data and route of the trip.

Figure 6:
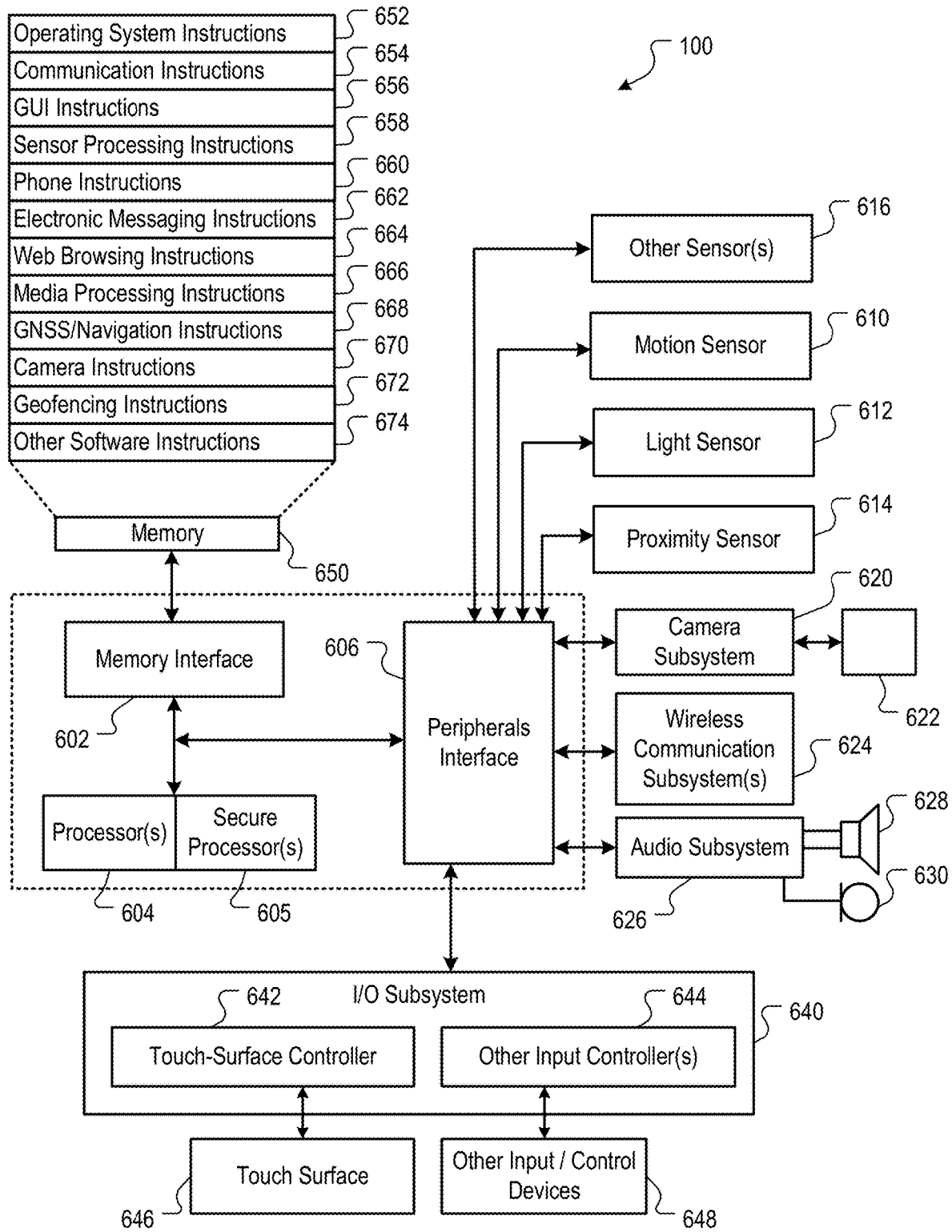
FIG. 6 shows a computing device according to an embodiment of the present disclosure.

FIG. 6 shows a computing device according to an embodiment of the present disclosure, for example a computing device configured to function as mobile device 100. Mobile device 100 may include a memory interface 602, one or more data processors, image processors, central processing units 604, and a peripherals interface 606. The memory interface 602, the one or more processors 604, and/or the peripherals interface 606 may be separate components or may be integrated in one or more integrated circuits. The various components in mobile device 100 may be coupled by one or more communication buses or signal lines and/or by one or more network connections.

Sensors, devices, and subsystems may be coupled to the peripherals interface 606 to facilitate multiple functionalities. For example, a motion sensor 610, a light sensor 612, and a proximity sensor 614 may be coupled to the peripherals interface 606 to facilitate orientation, lighting, and proximity functions. Other sensors 616 may also be connected to the peripherals interface 606, such as a global navigation satellite system (GNSS) (e.g., GPS receiver), a temperature sensor, a biometric sensor, magnetometer, or other sensing device, to facilitate related functionalities.

A camera subsystem 620 and an optical sensor 622, e.g., a charged coupled device (CCD) or a complementary metal-oxide semiconductor (CMOS) optical sensor, may be utilized to facilitate camera functions, such as recording photographs and video clips. The camera subsystem 620 and the optical sensor 622 may be used to collect images of a user to be used during authentication of a user, e.g., by performing facial recognition analysis.

Communication functions may be facilitated through one or more wired and/or wireless communication subsystems 624, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 624. The specific design and implementation of the communication subsystems 624 may depend on the communication network (s) over which mobile device 100 may be intended to operate. For example, mobile device 100 may include communication subsystems 624 designed to operate over a GSM network, a GPRS network, an EDGE network, a WiFi or WiMax network, and a Bluetooth™ network. For example, the wireless communication subsystems 624 may include hosting protocols such that mobile device 100 can be configured as a base station for other wireless devices and/or to provide a WiFi service.

An audio subsystem 626 may be coupled to a speaker 628 and a microphone 630 to facilitate voice-enabled functions, such as speaker recognition, voice replication, digital recording, and telephony functions. The audio subsystem 626 may be configured to facilitate processing voice commands, voiceprinting, and voice authentication, for example.

The I/O subsystem 640 may include a touch-surface controller 642 and/or other input controller(s) 644. The touch-surface controller 642 may be coupled to a touch surface 646. The touch surface 646 and touch-surface controller 642 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of the speaker 628 and/or the microphone 230.

In some implementations, a pressing of the button for a first duration may disengage a lock of the touch surface 646; and a pressing of the button for a second duration that is longer than the first duration may turn power to mobile device 100 on or off. Pressing the button for a third duration may activate a voice control, or voice command, module that enables the user to speak commands into the microphone 630 to cause the device to execute the spoken command. The user may customize a functionality of one or more of the buttons. The touch surface 246 can, for example, also be used to implement virtual or soft buttons and/or a keyboard.

In some implementations, mobile device 100 may present recorded audio and/or video files, such as MP3, AAC, and MPEG files. In some implementations, mobile device 100 may include the functionality of an MP3 player, such as an iPod™. Mobile device 100 may, therefore, include a 36-pin connector and/or 8-pin connector that is compatible with the iPod. Other input/output and control devices may also be used.

The memory interface 602 may be coupled to memory 650. The memory 650 may include high-speed random access memory and/or non-volatile memory, such as one or more magnetic disk storage devices, one or more optical storage devices, and/or flash memory (e.g., NAND, NOR). The memory 650 may store an operating system 652, such as Darwin, RTXC, LINUX, UNIX, OS X, WINDOWS, or an embedded operating system such as VxWorks.

The operating system 652 may include instructions for handling basic system services and for performing hardware dependent tasks. In some implementations, the operating system 652 may be a kernel (e.g., UNIX kernel). In some implementations, the operating system 652 may include instructions for performing voice authentication.

The memory 650 may also store communication instructions 654 to facilitate communicating with one or more additional devices, one or more computers and/or one or more servers. The memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 may store geofencing instructions 672 to facilitate other processes and functions, such as performing dynamic geofencing provisioning and/or automatic check in/checkout detection and/or logging as described herein.

The memory 650 may also store other software instructions 674, such as web video instructions to facilitate web video-related processes and functions; and/or web shopping instructions to facilitate web shopping-related processes and functions. In some implementations, the media processing instructions 666 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 650 may include additional instructions or fewer instructions. Furthermore, various functions of mobile device 100 may be implemented in hardware and/or in software, including in one or more signal processing and/or application specific integrated circuits.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of determining presence of a mobile device at a location of interest, comprising:
detecting, by a location system of the mobile device, a first location of the mobile device;
determining, by a processor of the mobile device, that the first location is within a geofence surrounding the location of interest;
after detecting the first location, detecting, by the location system, a second location of the mobile device different from the first location;
determining, by the processor, that the second location is within the geofence;
determining, by the processor, a speed at which the mobile device traveled from the first location to the second location, determining the speed comprising determining a distance between the first location and the second location, determining a time difference between the detection of the first location and the detection of the second location, and calculating the speed from the distance and the time difference;
determining, by the processor, that the mobile device is loitering at the location of interest in response to the speed being below a threshold value, wherein a radius of the geofence surrounding the location of interest is based on the speed of the mobile device or the speed of the mobile device multiplied by a constant multiplier; and
in response to determining that the mobile device is loitering at the location of interest, performing, by the processor, check in processing to check a user of the mobile device as being on site at the location of interest.

2. The method of claim 1, wherein:
detecting the first location includes generating a first time stamp indicating when the first location was detected;
detecting the second location includes generating a second time stamp indicating when the second location was detected; and
determining the speed includes determining a time between the first time stamp and the second time stamp as a time it took the mobile device to travel from the first location to the second location.

3. The method of claim 1, wherein:
the second location is detected after passage of a known interval of time from the detecting of the first location; and
determining the speed includes using the known time interval as a time it took the mobile device to travel from the first location to the second location.

4. The method of claim 1, further comprising:
after performing the check in processing, detecting, by the location system, a third location of the mobile device outside the geofence; and
in response to detecting the third location, performing, by the processor, check out processing to check the user of the mobile device as being no longer on site at the location of interest.

5. The method of claim 4, wherein the check out processing includes:
generating a time stamp indicating when the third location was detected; and
automatically logging, by the processor, the user as being checked out of the location of interest as of a time at which the time stamp was generated.

6. The method of claim 4, wherein the check out processing includes:
generating a time stamp indicating when the third location was detected;
prompting the user to check out;
receiving, by an input device of the mobile device, a user command to check out; and logging, by the processor, the user as being checked out of the location of interest as of a time at which the time stamp was generated.

7. The method of claim 1, wherein the check in processing includes:
generating at least one time stamp indicating when at least one of the first location and the second location was detected; and
automatically logging, by the processor, the user as being checked into the location of interest as of a time at which the at least one time stamp was generated.

8. The method of claim 1, wherein the check in processing includes:
generating at least one time stamp indicating when at least one of the first location and the second location was detected;
prompting the user to check in;
receiving, by an input device of the mobile device, a user command to check in; and
logging, by the processor, the user as being checked into the location of interest as of a time at which the at least one time stamp was generated.

9. A mobile device comprising:
a location system configured to detect a first location of the mobile device and, after detecting the first location, detect a second location of the mobile device different from the first location; and
a processor configured to:
determine that the first location is within a geofence surrounding the location of interest;
determine that the second location is within the geofence;
determine a speed at which the mobile device traveled from the first location to the second location, determining the speed comprising determining a distance between the first location and the second location, determining a time difference between the detection of the first location and the detection of the second location, and calculating the speed from the distance and the time difference;
determine that the mobile device is loitering at the location of interest in response to the speed being below a threshold value, wherein a radius of the geofence surrounding the location of interest is based on the speed of the mobile device or the speed of the mobile device multiplied by a constant multiplier; and
in response to determining that the mobile device is loitering at the location of interest, perform check in processing to check a user of the mobile device as being on site at the location of interest.

10. The system of claim 9, wherein:
the processor is configured to detect the first location by a process including generating a first time stamp indicating when the first location was detected;
the processor is configured to detect the second location by a process including generating a second time stamp indicating when the second location was detected; and
the processor is configured to determine the speed by a process including determining a time between the first time stamp and the second time stamp as a time it took the mobile device to travel from the first location to the second location.

11. The system of claim 9, wherein:
the second location is detected after passage of a known interval of time from the detecting of the first location; and the processor is configured to determine the speed by a process including using the known time interval as a time it took the mobile device to travel from the first location to the second location.

12. The system of claim 9, wherein:
the location system is further configured to detect, after the check in processing is performed, a third location of the mobile device outside the geofence; and
the processor is further configured to perform, in response to detecting the third location, check out processing to check the user of the mobile device as being no longer on site at the location of interest.

13. The system of claim 12, wherein the check out processing includes:
generating a time stamp indicating when the third location was detected; and
automatically logging, by the processor, the user as being checked out of the location of interest as of a time at which the time stamp was generated.

14. The system of claim 12, wherein the check out processing includes:
generating a time stamp indicating when the third location was detected;
prompting the user to check out;
receiving, by an input device of the mobile device, a user command to check out; and
logging, by the processor, the user as being checked out of the location of interest as of a time at which the time stamp was generated.

15. The system of claim 9, wherein the check in processing includes:
generating at least one time stamp indicating when at least one of the first location and the second location was detected; and
automatically logging, by the processor, the user as being checked into the location of interest as of a time at which the at least one time stamp was generated.

16. The system of claim 9, wherein the check in processing includes:
generating at least one time stamp indicating when at least one of the first location and the second location was detected;
prompting the user to check in;
receiving, by an input device of the mobile device, a user command to check in; and
logging, by the processor, the user as being checked into the location of interest as of a time at which the at least one time stamp was generated.

17. A method of tracking a mobile device location, comprising:
detecting, by a location system of the mobile device, a first location of the mobile device at a first time;
after detecting the first location, detecting, by the location system, a second location of the mobile device different from the first location at a second time;
confirming, by the processor, an accuracy of at least one of the first location and the second location, the confirming comprising:
determining a distance between the first location and the second location,
determining a time difference between the detection of the first location and the detection of the second location,
calculating a presumed speed from the distance and the time difference, and
determining that the presumed speed is below a threshold value;

in response to the confirming, determining, by the processor, an actual speed at which the mobile device traveled from the first location to the second location;

generating, by the processor, a geofence centered at the first location or the second location, the geofence having a radius based on the actual speed, generating the geofence comprising calculating the radius from a fence size value plus the actual speed; and reporting, by the processor, a location of the mobile device as being within the geofence until a crossing of the geofence is detected by the location system.

18. The method of claim 17, wherein determining the speed comprises taking the calculated presumed speed as the actual speed.

19. The method of claim 17, further comprising:

detecting, by the location system, the crossing of the geofence, the detecting of the crossing including detecting a third location of the mobile device at an edge of the geofence; and in response to the detecting of the crossing:
generating, by the processor, a second geofence centered at the third location, the geofence having a radius defined as the actual speed times a multiplier constant plus a fence size value; and reporting, by the processor, a location of the mobile device as being within the second geofence until a crossing of the second geofence is detected by the location system.

20. The method of claim 17, wherein calculating the radius further comprises multiplying the actual speed times a multiplier constant.

* * * * *